UNITED STATES PATENT OFFICE.

FRITZ HABER AND ROBERT LE ROSSIGNOL, OF KARLSRUHE, GERMANY, ASSIGNORS TO BADISCHE ANILIN & SODA FABRIK, OF LUDWIGSHAFEN-ON-THE-RHINE, GERMANY, A CORPORATION OF BADEN.

PRODUCTION OF AMMONIA.

971,501.      Specification of Letters Patent.      Patented Sept. 27, 1910.

No Drawing.      Application filed August 13, 1909.      Serial No. 512,679.

*To all whom it may concern:*

Be it known that we, FRITZ HABER, Ph. D., professor of chemistry, and ROBERT LE ROSSIGNOL, bachelor of science, subjects, respectively, of the King of Prussia and the King of England, residing at Karlsruhe, Germany, have invented new and useful Improvements in the Production of Ammonia, of which the following is a specification.

Several attempts have hitherto been made to produce ammonia on a large scale from its elements by passing them over a catalyst, but up to the present not much success has been met with.

In order that a process should be successful, it is advisable that the combination take place at as low a temperature and as quickly as possible, since when the temperature increases the concentration of the ammonia formed decreases.

We have now discovered that on passing gases containing nitrogen and hydrogen over osmium large quantities of ammonia can be obtained. This result is surprising, since it differs in this respect from the allied metal platinum (see *Zeitschrift für Elektrochemie*, vol. 14, p. 191).

In carrying out this invention, osmium can be used either in the form of the metal (preferably in a very finely divided condition) or in the form of a compound of the metal which upon being used becomes converted into metallic osmium, and the metal or its compound can be used either alone or in admixture with other substances or compounds. The osmium can be employed, for instance, in the form of metallic osmium, or it may be precipitated on a suitable carrier, such for instance as quartz, asbestos, clay, and the like. Asbestos containing ten per cent. of osmium is suitable for use. Further instead of metallic osmium, other suitable osmium compounds can be employed, such for instance as osmium oxid hydrate (prepared by the reaction of formaldehyde on an alcoholic solution of osmic acid, *cf. Berichte* 40, 1387), which under the action of the hydrogen used is converted into metallic osmium; or Fremy's salt can be used as the starting material, and either alone or mixed with an indifferent substance, or precipitated on a suitable carrier. Under the action of hydrogen it becomes converted into metallic osmium. The reaction can be carried out at ordinary pressure, but we prefer to carry it out under increased pressure, for instance at from 100 to 200 atmospheres.

As an example of the manner of carrying out the process of our invention, we give the following without in any way being confined to this example. Pass slowly a mixture of about three parts by volume of hydrogen and one part by volume of nitrogen over finely divided osmium at a pressure of one hundred and seventy-five atmospheres and at a temperature of about five hundred and fifty degrees centigrade. A yield of eight per cent. by volume of ammonia can easily be obtained.

Now what we claim is:

1. The process of producing ammonia by passing gases containing nitrogen and hydrogen over a catalyst containing osmium.

2. The process of producing ammonia by passing gases containing nitrogen and hydrogen over a heated catalyst containing osmium.

3. The process of producing ammonia by passing gases containing nitrogen and hydrogen under pressure over a heated catalyst containing osmium.

4. The process of producing ammonia by passing a mixture of nitrogen and hydrogen over a catalyst containing osmium at a pressure above 100 atmospheres.

5. The process of producing ammonia by passing a mixture of nitrogen and hydrogen over a heated catalyst containing osmium at a pressure above 100 atmospheres.

6. The process of producing ammonia by passing a mixture of hydrogen and nitrogen over heated osmium at a pressure above 100 atmospheres.

In testimony whereof we have hereunto set our hands in the presence of two subscribing witnesses.

FRITZ HABER.
    ROBERT LE ROSSIGNOL.

Witnesses:
    J. ALEC. LLOYD,
    A. RENSLINGER.